No. 688,597. Patented Dec. 10, 1901.
W. H. COOKMAN & S. W. NEALL.
DISCHARGE DEVICE FOR BELT CONVEYERS.
(Application filed Oct. 22, 1900.)
(No Model.) 5 Sheets—Sheet 1.

Witnesses:—
Wm. A. Barr
Louis A. Whitehead

Inventors:
William H. Cookman
Samuel W. Neall
by their Attorneys:—
Howson & Howson

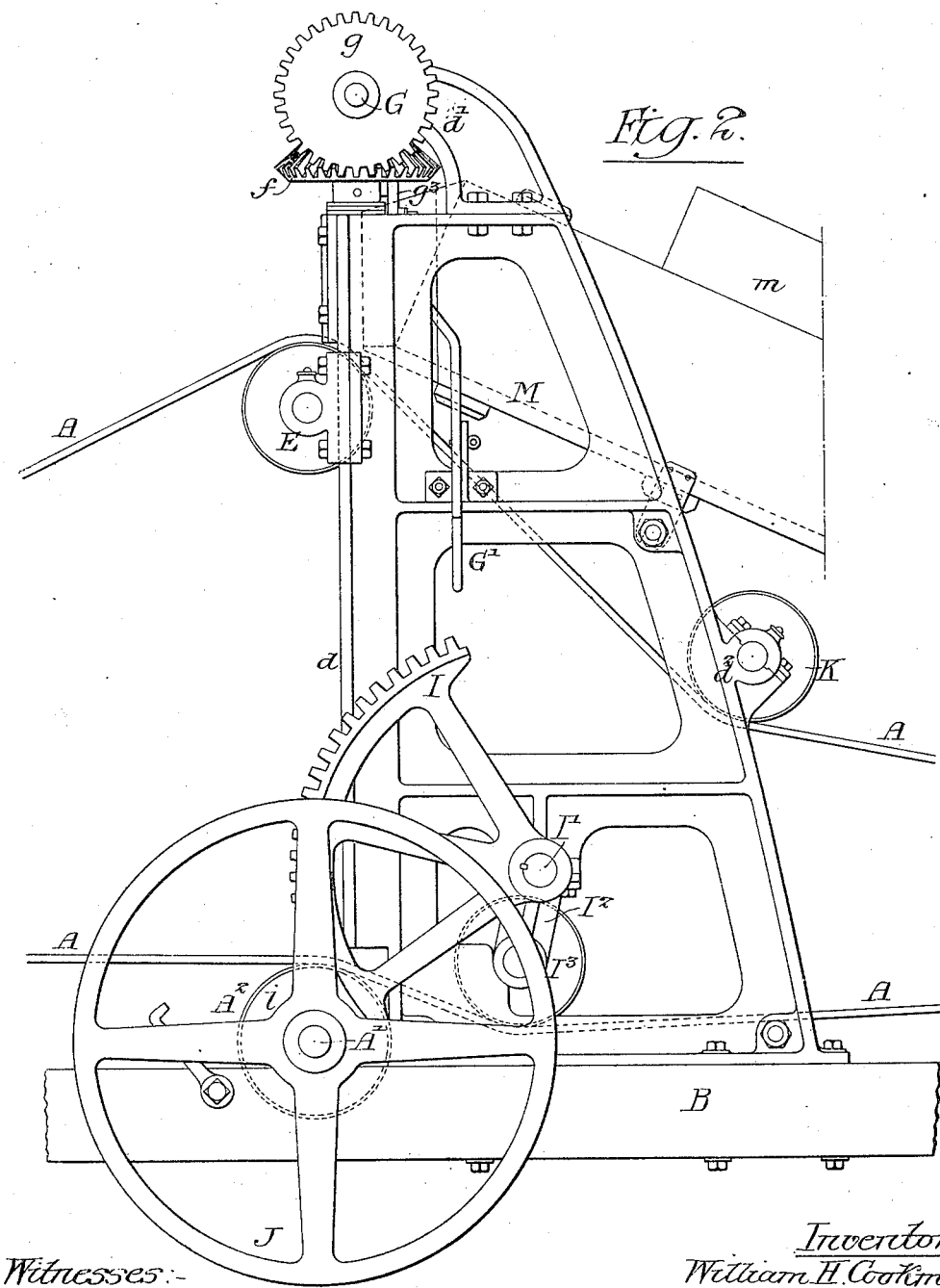

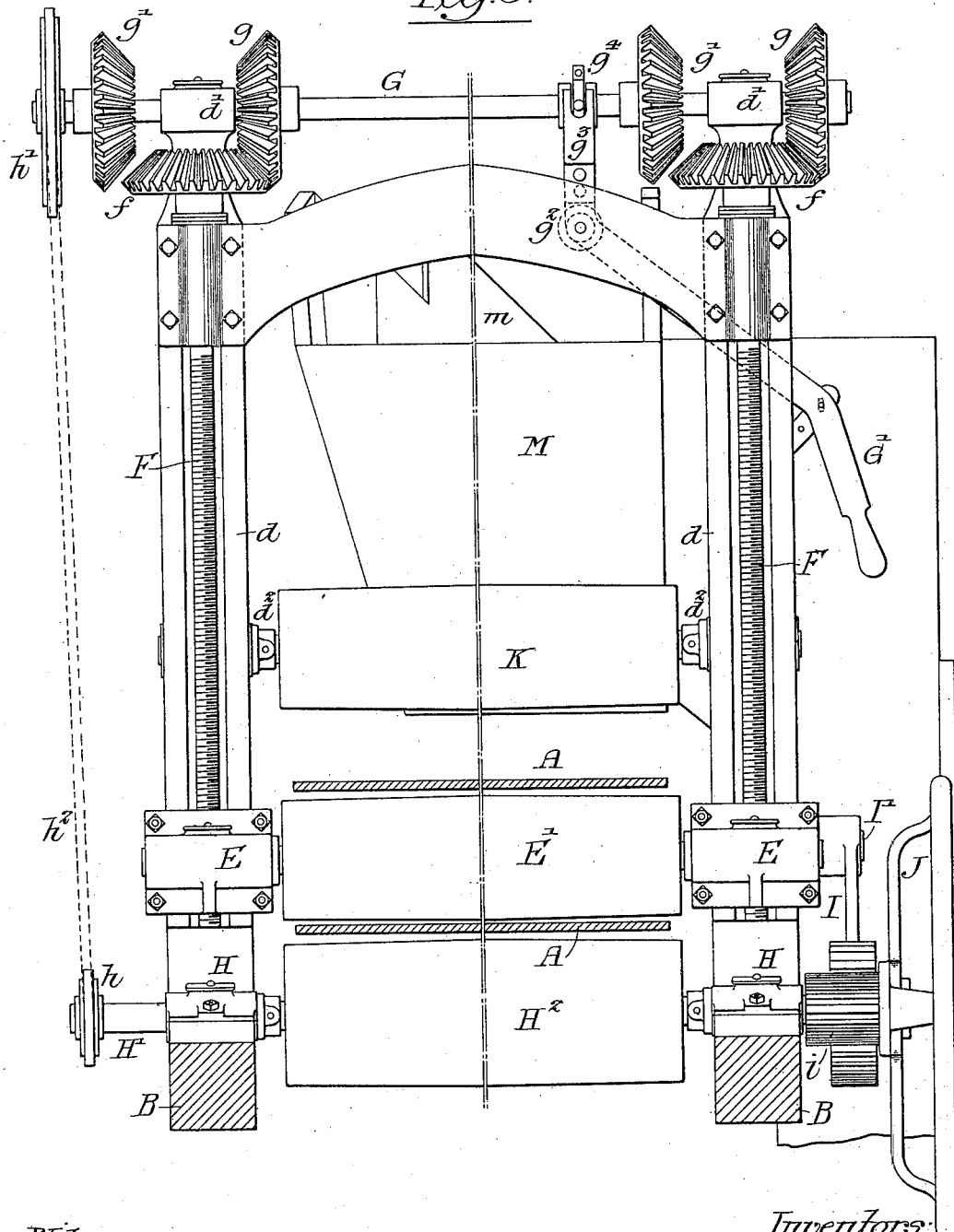

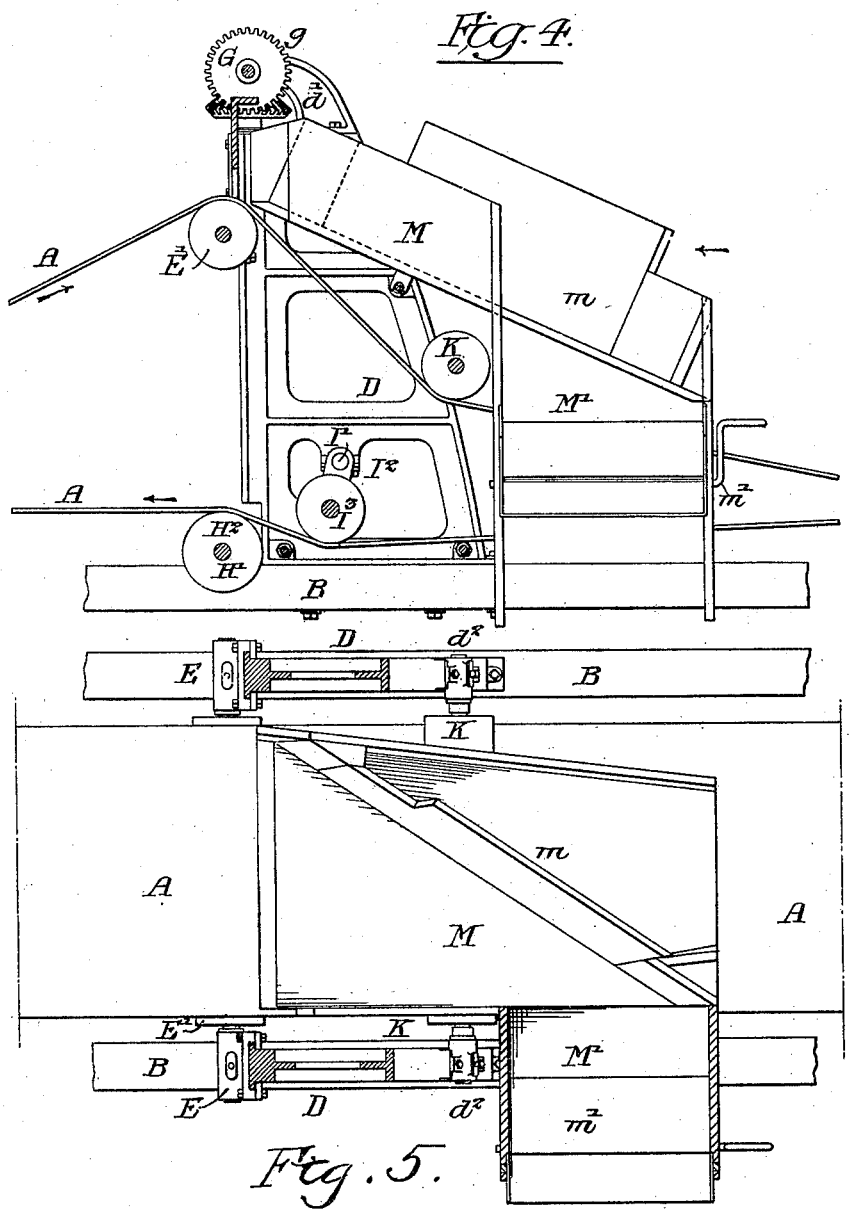

No. 688,597. Patented Dec. 10, 1901.
W. H. COOKMAN & S. W. NEALL.
DISCHARGE DEVICE FOR BELT CONVEYERS.
(Application filed Oct. 22, 1900.)

(No Model.) 5 Sheets—Sheet 5.

Witnesses:—

Inventors:
William H. Cookman
Samuel W. Neall
by their Attorneys:

UNITED STATES PATENT OFFICE.

WILLIAM H. COOKMAN AND SAMUEL W. NEALL, OF PHILADELPHIA, PENNSYLVANIA, ASSIGNORS TO THE LINK BELT ENGINEERING COMPANY, OF PHILADELPHIA, PENNSYLVANIA, A CORPORATION OF PENNSYLVANIA.

DISCHARGE DEVICE FOR BELT CONVEYERS.

SPECIFICATION forming part of Letters Patent No. 688,597, dated December 10, 1901.

Application filed October 22, 1900. Serial No. 33,875. (No model.)

*To all whom it may concern:*

Be it known that we, WILLIAM H. COOKMAN and SAMUEL W. NEALL, citizens of the United States, and residents of Philadelphia, Pennsylvania, have invented certain Improvements in Discharge Devices for Belt Conveyers, of which the following is a specification.

The main object of our invention is to so construct a discharge device for belt conveyers that it will be entirely free from the belt when not in use and will simply deflect the belt when in use; and a further object is to utilize the belt as a means of shifting the discharge mechanism; and a still further object is to provide means for removing any quantity of material from the belt, as fully described hereinafter.

Figure 1:
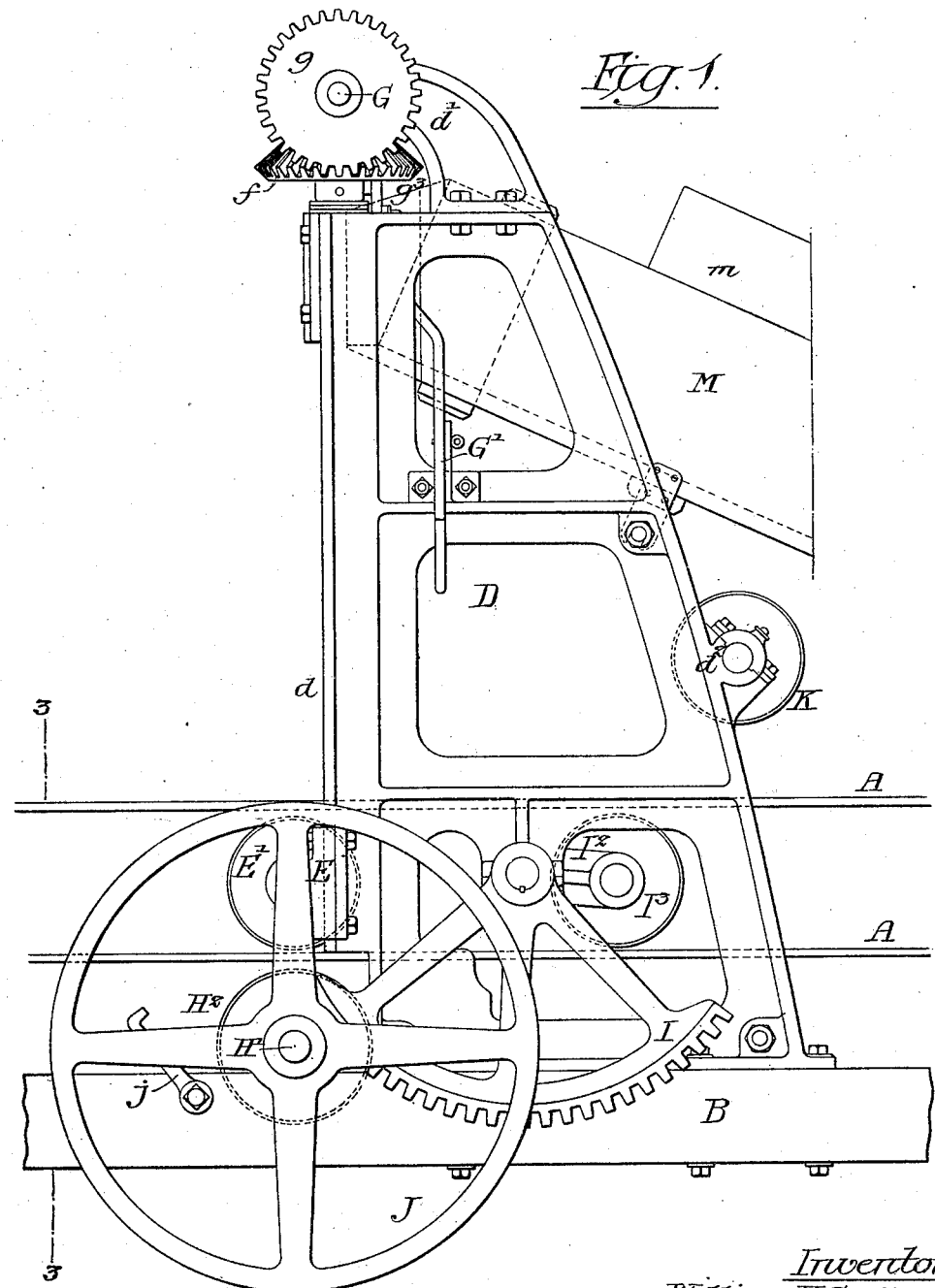
Figure 6:
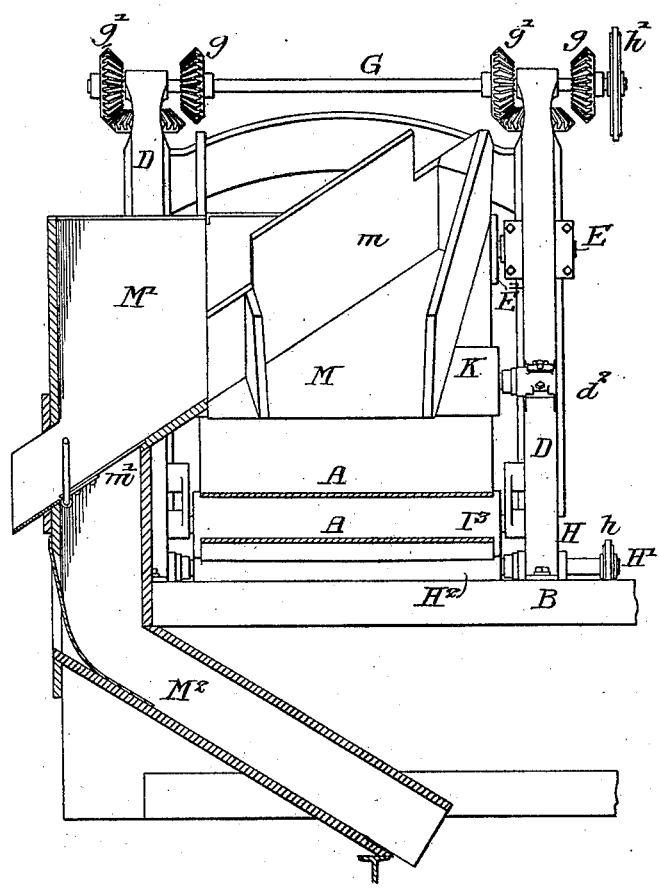

In the accompanying drawings, Figure 1 is a side view of our improved discharge device for belt conveyers, showing it out of action. Fig. 2 is a similar view showing the discharge device in action and just previous to the time when the operating device therefor is stopped. Fig. 3 is a section on the line 3 3, Fig. 1. Fig. 4 is a side view showing the chutes for conveying the material from the belt. Fig. 5 is a plan view of Fig. 4, and Fig. 6 is a view of the chutes looking in the direction of the arrow, Fig. 4.

A is the conveyer-belt, which may be of any material desired.

On the beams B is mounted a frame D. On the face of the frame D are slideways $d$, and arranged to travel on these slideways are the bearings E for the roll E'. The bearings are adjusted by vertically-arranged screws, which are mounted in bearings in the frame D and pass through nuts on the bearings E, so that on turning the screws the roll E' will be raised or lowered. On the upper end of each screw is a bevel-wheel $f$, meshing with either of the wheels $g$ $g'$ on a transverse shaft G, having bearings in boxes $d'$. By throwing either one or the other of the wheels $g$ $g'$ into gear with the wheel $f$ of the screws the bearings and the roll can be raised or lowered. This is done in the present instance by means of a shifting lever G', pivoted at $g^2$. The lever has a forked arm $g^3$ engaging a sleeve $g^4$ on the shaft G. The shifting lever G' is within easy reach of the operator.

Mounted in bearings H H is a shaft H', having a friction-roll $H^2$, which is situated directly under the lower run of the belt A. This shaft has at one end a sprocket-wheel $h$, which drives a sprocket-wheel $h'$ on the shaft G by means of a drive-chain $h^2$. (Shown by dotted lines in Fig. 3.) When the lower run of the belt is forced into contact with the friction-roll $H^2$, the shaft is driven, and motion is imparted to the screws F through the drive-chain and transverse shaft G, above described, so as to vertically adjust the roll E'.

On the shaft H' is a gear-wheel $i$, which meshes with a segment I on the shaft I'. This shaft is mounted in bearings in the frame D, and on the shaft are arms $I^2$, carrying a roll $I^3$. The pinion $i$ is loose on the shaft H' and is provided with a hand-wheel J. We provide a locking-pawl $j$, pivoted to one of the beams B, and this locking-pawl may be shifted so as to engage the teeth of the pinion $i$ and hold it in the adjusted position. When the hand-wheel J is turned, it will shift the segment I, and consequently the roll $I^3$, and as this roll is between the upper and lower runs of the belt it can be shifted so as to force the lower run of the belt down into frictional contact with the friction-roll $H^2$, which drives the adjusting mechanism.

Mounted in bearings $d^2$ on the frame is a roll K. This roll limits the upward movement of the upper run of the belt when the mechanism is shifted so as to elevate the roll E' to the position shown in Fig. 2. Directly above this roll is a fixed inclined chute M, which is so arranged that when the conveying-belt is elevated to the position shown in Fig. 2 it will receive the grain or other material from the belt as it passes around the wheel E'. This abrupt turn causes the material to be discharged directly into the chute; but as soon as the roll E' is lowered the belt is removed from the chute, and when the belt is in the position shown in Fig. 1 it will simply pass the discharge mechanism without discharging its load. We preferably so arrange the chute that the entire load of the belt can be discharged and carried away from the belt, or a portion of the load may be discharged and the balance returned to the belt beyond the discharge device. This is accomplished by making the chute with deflector *m*, pivoted in any desired manner, as shown in the plan view, Fig. 5. This deflector can be set to the full width of the chute, as shown, so that the entire load will be discharged, or may be set half-way over, so that a portion of the load will be discharged and the other portion will be returned to the belt beyond the roll K to be removed further on, if necessary. The side chute M', which is connected to the main chute M, is provided with a gate *m'*, so that the material can be either discharged in line with the chute M' or can be carried under the conveyer through a chute $M^2$. This form of apparatus is especially advantageous in grain-elevators, where it is desired to either shoot the material to the right or left of the conveying-belt.

A series of the above-described discharge mechanisms may be placed at intervals throughout the length of the run of the conveyer, and in some instances may be mounted so as to be adjusted along the belt, although we prefer to have a number of these devices at predetermined intervals.

We claim as our invention—

1. The combination with a discharge device for belt conveyers, of a conveyer-belt, a chute above the belt, and means for raising the belt at will so as to cause the material carried thereby to be discharged into said chute, substantially as described.

2. The combination with a discharge device for conveyer-belts, of a conveyer-belt, a roll situated under the carrying-run of the belt, and means for elevating the roll parallel to itself so as to deflect the belt to discharge the material therefrom, substantially as described.

3. The combination of a conveyer-belt, a roll mounted under the carrying-run of the belt, means for elevating said roll, a roll for limiting the upward movement of the belt, and a discharge-chute to receive the material from the belt when the belt is deflected, substantially as described.

4. The combination of a conveyer-belt, a discharge device, means for deflecting the said belt, with drive mechanism, and means for throwing the said drive mechanism into frictional contact with the belt whereby said belt becomes the driver for adjusting itself relatively to the discharge device, substantially as described.

5. The combination of a belt, a shifting roll mounted under the carrying-run of the belt, means for raising and lowering said roll to deflect the belt, a friction-roll mounted in close proximity to the return-run of the belt, and means for forcing the return-run of the belt in contact with the friction-roll, said friction-roll being geared to the operating mechanism of the shifting roll for the main run of the belt, substantially as described.

6. The combination of an endless belt, a roll mounted under the carrying-run of the belt, a frame, guideways on the frame, bearings for said roll mounted on said guideways, screws engaging the said bearings, means for driving the screws to raise or lower the roll, friction mechanism connected to said means, and means for throwing the belt into gear with the friction mechanism, substantially as described.

7. The combination of a belt, a chute mounted above the carrying-run of said belt, means for moving the carrying-run of the belt up to the chute whereby the material carried by the belt will be transferred to the chute, said chute having two discharge-passages, one directly over the belt and one at the side of the belt, and a deflector for controlling the discharge of the material through the chute, substantially as described.

8. The combination of a belt conveyer, a chute above the carrying-run of the said conveyer, means for raising the carrying-run of the belt into close proximity to the chute, a continuation of the chute at one side of the belt, a chute returning under the belt, and a gate for controlling the flow of material to either chute, substantially as described.

In testimony whereof we have signed our names to this specification in the presence of two subscribing witnesses.

WILLIAM H. COOKMAN.
SAMUEL W. NEALL.

Witnesses:
WILL. A. BARR,
JOS. H. KLEIN.